United States Patent [19]

Ishida et al.

[11] Patent Number: 4,466,036
[45] Date of Patent: Aug. 14, 1984

[54] MAGNETIC TAPE CASSETTE

[75] Inventors: Toshihiko Ishida; Haruo Shiba; Takateru Sato, all of Tokyo, Japan

[73] Assignee: TDK Electronics Co., Ltd., Tokyo, Japan

[21] Appl. No.: 461,174

[22] Filed: Jan. 26, 1983

[30] Foreign Application Priority Data

Feb. 3, 1982 [JP] Japan ............................ 57-12928[U]
Feb. 3, 1982 [JP] Japan ............................ 57-12929[U]

[51] Int. Cl.³ .................... G11B 15/32; G11B 23/04
[52] U.S. Cl. .................................. 360/132; 242/199
[58] Field of Search ......................... 360/132, 92–93, 360/130.2, 130.21; 242/199

[56] References Cited

U.S. PATENT DOCUMENTS 3,675,875  7/1972  Schmidt ............................ 242/199
4,102,515  7/1978  Milants ............................. 242/199
4,289,285  9/1981  Ishida et al. ..................... 242/199

FOREIGN PATENT DOCUMENTS 2732083  1/1978  Fed. Rep. of Germany ...... 360/199

Primary Examiner—John H. Wolff
Attorney, Agent, or Firm—Oblon, Fisher, Spivak, McClelland & Maier

[57] ABSTRACT

A magnetic tape cassette provided with a separating sheet interposed between a magnetic recording tape and a half casing. The separating sheet is provided with first protrusions projecting toward the tape and second protrusions projecting toward the half casing.

6 Claims, 18 Drawing Figures

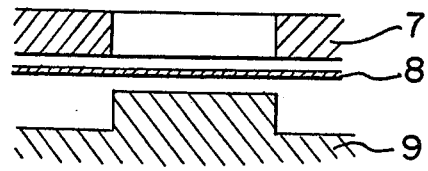
FIGURE 3(a)
PRIOR ART
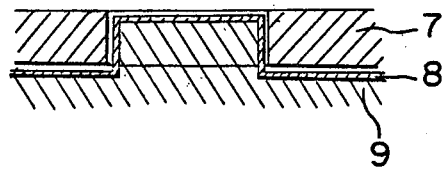
FIGURE 3(b)
PRIOR ART
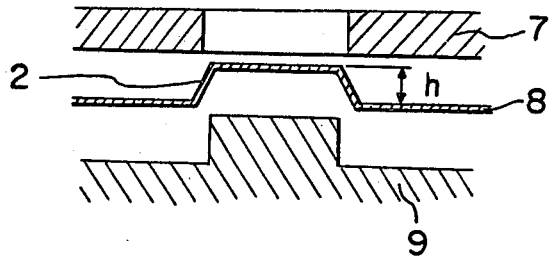
FIGURE 3(c)
PRIOR ART
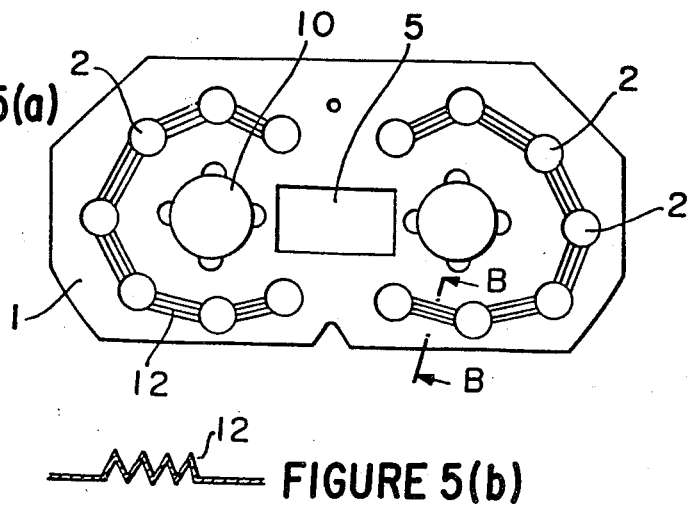
FIGURE 5(a)
PRIOR ART
FIGURE 5(b)
PRIOR ART

MAGNETIC TAPE CASSETTE

The present invention relates to a magnetic tape cassette.

A magnetic tape cassette is usually provided with a separating sheet interposed between a magnetic recording tape and a half casing in order to ensure smooth running of the tape. The separating sheet is made of, for instance, a composite material composed of a plastic such as high density polyethylene or tetrafluoroethylene, for instance, graphite teflon (trade name of DuPont Co.) and a lubricant. In such a case, in order to interpose the separating sheet, it is necessary to provide a clearance greater than the thickness of the separating sheet between the tape and the half casing. If this clearance is too narrow, the friction of the separating sheet with the tape during the tape running operation tends to be great. On the other hand, if the clearance is too wide, the winding of the tape tends to be non-uniform whereby the tape is likely to be damaged along its side edges.

It has been proposed to provide curls or various fold-ridges to the separating sheet so as to minimize the friction with the tape even when the clearance is made small. However, such curls or fold-ridges establish a line contact with the tape whereby the friction can not adequately be minimized. Further, it has been difficult to control the shape and the degree of such curls or fold-ridges in an industirally feasible manner. Furthermore, the curls or the fold-ridges have a drawback that they tend to be flattened when heated or when the weight of the tape is imparted thereto for a long period of time.

In recent years, the quality standard required for magnetic tape cassettes has become extremely high and it is especially important that the tape winding (i.e. the winding of the magnetic recording tape) is uniform. Namely, if the tape winding becomes inconsistent or non-uniform as a result of operational combination of the playing (reproduction operation), fast forwarding (FF) and rewinding (RW), the wound tape tends to be pressed strongly against the separating sheet and the torque will thereby be increased, whereby a great load will be imparted to the winding motor of the deck and consequently, it becomes difficult for the tape to run smoothly. Further, if the tape winding is inconsistent or non-uniform, it is likely that during the reproduction operation, the inconsistently wound-up portion of the tape is abruptly released whereby the load torque is abruptly reduced to create a variation in the tension of the tape. This variation in the tension of the tape leads to dislocation of the tape or stick-slip of the tape relative to the reproducing head, thus leading to a variation in the reproduction output, whereby the reproduction becomes inferior. Further, it is needless to say that when the tape winding is uniform, the wound tape presents a good outer-appearance, which adds to a commercial value of the magnetic tape cassette.

In order to overcome the above difficulties, the present inventors have earlier proposed to provide protrusions (i.e. dimples) to one side of the separating sheet. The contact area of the dimples with the tape is small and the dimples provide good cushion or buffer effects, whereby the above mentioned difficulties have been overcome to a large extent. However, no adequate solution can thereby be attained with respect to the tape winding. It has been found that the tape winding can be improved by increasing the height of the dimples of the separating sheet. However, in order to obtain the required height of the dimples, it is necessary that in the preparation of the separating sheet, a sheet material must be subjected to deep-drawing to form such dimples. The deep-drawability of the sheet material is restricted by the nature and the thickness of the sheet material. Namely, if drawn too deeply, it is likely that the sheet material ruptures at the drawn portions or wrinkles are likely to be formed. If the wrinkles are formed, it becomes difficult to control the height of the dimples and the cushion or buffer effects of the dimples will be inferior. Further, the outer appearance of the separating sheet will be inferior.

Accordingly, it is an object of the present invention to provide a magnetic tape cassette provided with an improved separating sheet which is free from the above mentioned drawbacks.

The present invention provides a magnetic tape cassette provided with a separating sheet interposed between a magnetic recording tape and a half casing, in which said separating sheet is provided with first protrusions projecting toward the tape and second protrusions projecting toward the half casing.

Now, the present invention will be described in further detail with reference to the accompanying drawings.

FIGS. 3(a), (b) and (c) are cross sectional veiws illustrating the process for forming protrusions (i.e. dimples). FIG. 3(a) illustrates the first stage prior to the formation of a protrusion, FIG. (b) illustrates the second stage in which the protrusion has been formed and FIG. (c) illustrates the third stage where the upper and lower dies are opened after the formation of the protrusion.

Figure 4:
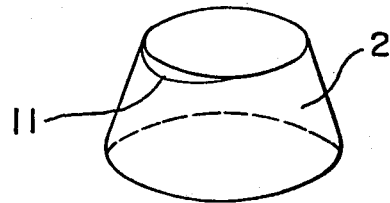

FIG. 4 is a perspective view of a dimple formed by the deep-drawing.

FIG. 5(a) is a plan view of a separating sheet provided with deep-drawn dimples.

FIG. 5(b) is a cross sectional view taken along line B—B of FIG. 5(a).

Figure 6A:
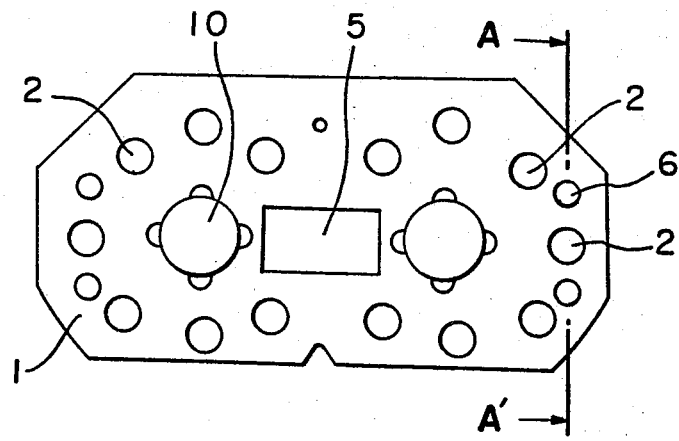

FIG. 6(a) is a plan view of a separating sheet according to one embodiment of the present invention.

Figure 6B:
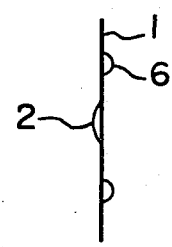

FIG. 6(b) is a cross sectional view taken along line A—A of FIG. 6(a).

Figure 7:
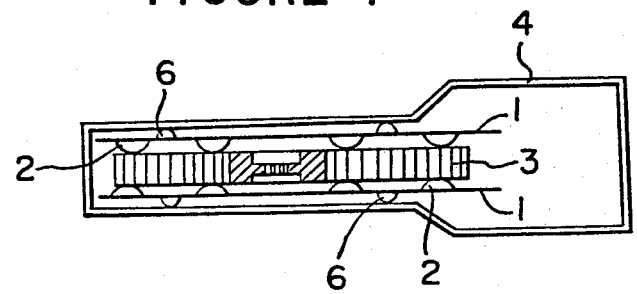

FIG. 7 is a cross sectional view of a magnetic tape cassette provided with the separating sheet of FIGS. 6(a) and (b).

Figure 8A:
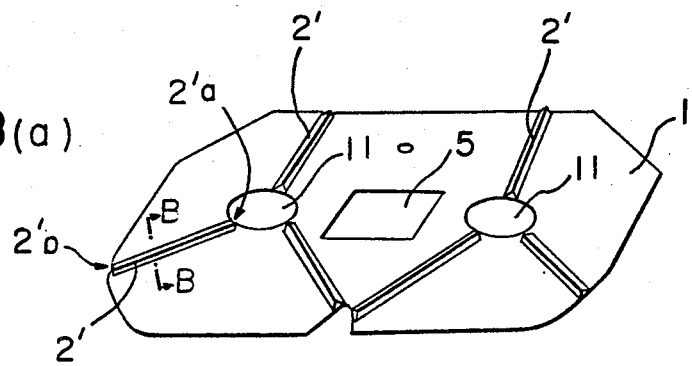

FIG. 8(a) is a perspective view of a conventional separating sheet provided with fold-ridges.

Figure 8B:
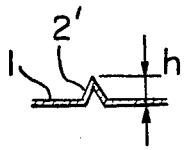

FIG. 8(b) is a cross sectional view taken along B—B of FIG. (a).

Figure 9A:
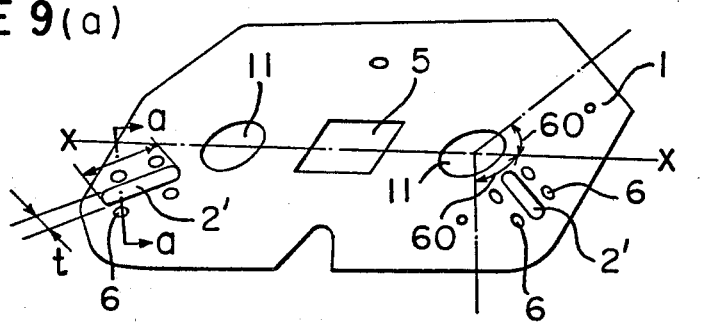

FIG. 9(a) is a perspective view of a separating sheet according to another embodiment of the present invention.

Figure 9B:
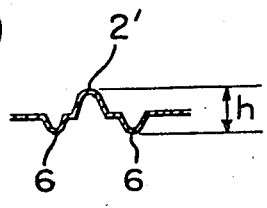

FIG. 9(b) is a cross sectional view taken along line a—a of FIG. 9(a).

Figure 10:
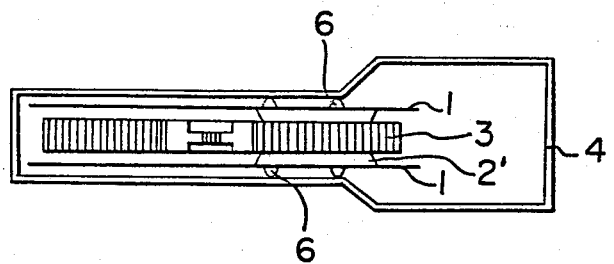

FIG. 10 is a cross sectional view of a magnetic tape cassette provided with the separating sheet of FIGS. 9(a) and (b).

Figure 11:
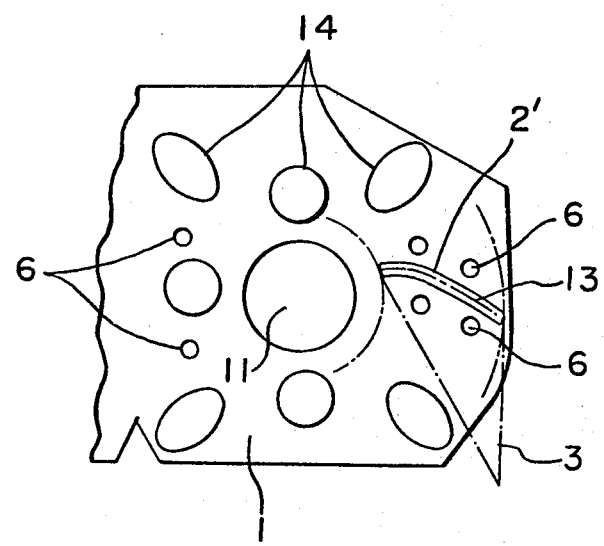

FIG. 11 is a plan view of a part of a separating sheet according to a further embodiment of the present invention.

Figure 1A:
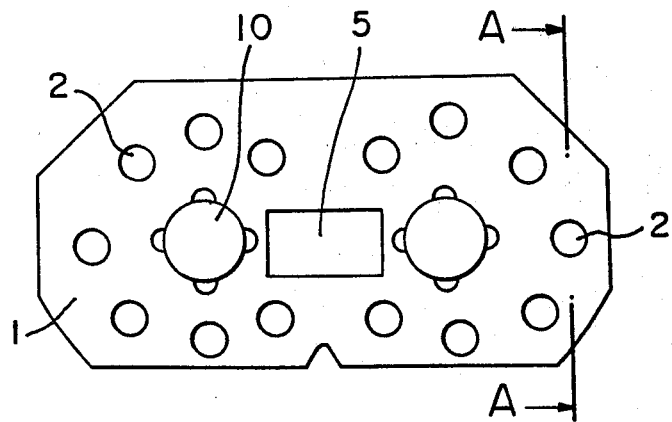
FIG. 1(a) is a plan view of a conventional separating sheet.
Figure 1B:
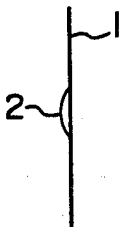
FIG. 1(b) is a cross sectional view taken along line A—A of FIG. 1(a).
Figure 2:
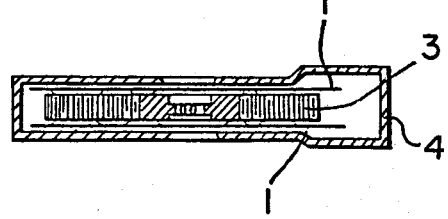
FIG. 2 is a cross sectional view of a magnetic tape cassette provided with the separating sheet of FIGS. 1(a) and (b).

FIGS. 1(a) and (b) show the separating sheet 1 previously proposed by the present inventor, in which a plurality of dome-shaped or truncated cone-shaped protrusions 2 (dimples) are provided. Reference numeral 5 designates a see-through window, through which the winding of the tape is observable, and reference numeral 10 designates holes for shafts for driving the magnetic recording tape. This separating sheet is interposed between the tape 3 and a half casing 4 with the protrusions facing the tape as shown in FIG. 2. The dimples 2 do not necessary provide a point contact with the tape, but the contacting area of the dimples with the tape is small and the dimples provide good cushion or buffer effects. However, in respect of the tape winding, no adequate solution can not be attained by this separating sheet. According to the research by the present inventors, the tape winding can be improved by increasing the height of the dimples of the separating sheet. However, in order to increase the height of the dimples, it is necessary to subject a sheet material to deep-drawing to obtain such a separating sheet. If drawn to deeply, however, the sheet material ruptures at the drawn portions. This will be explained more specifically with reference to FIG. 3. The dimple forming machine comprises a female die 7 having an opening of a shape substantially corresponding to the shape of a desired dimple and a male die 9 having a projection to be inserted in the opening of the female die. The sheet material 8 is placed between the female and male dies as shown in FIG. 3(a) and then subjected to deep-drawing as shown in FIG. 3(b), whereupon a protrusion 2 (a dimple) will be formed as shown in FIG. 3(c). The degree of the drawing of the dimple is represented by the height h. However, the height is restricted by the nature and the thickness of the sheet material. Namely, if the sheet material is drawn too deeply, the dimple 2 ruptures as shown at 11 in FIG. 4. Even if the sheet material is not so deeply drawn as to lead rupture of the sheet, wrinkles are likely to be formed between adjacent dimples due to the strain created by the deep-drawing. FIG. 5(a) is a plan view of the sheet illustrating the formation of the wrinkles, and FIG. 5(b) showns a cross section of the wrinkles. If the wrinkles are formed, it becomes difficult to control the height h of the dimples, and the cushion or buffer effects of the dimples tend to be inferior. Needless to say, the outer appearance of the separating sheet is thereby impaired.

Further, if drawn to a great extent in a single drawing operation, the sheet material tend to be stiff, whereby the cushion or buffer effects will be lost.

In contrast, according to the present invention, the separate sheet is provided with the first and second protrusions (dimples), the first protrusions projecting toward the tape and the second protrusions projecting toward the half-casing, whereby the cushion or buffer effects of the separating sheet are improved. It is thereby possible to obtain consistent and uniform tape winding.

Now, the present invention will be described in detail with reference to the drawings.

FIG. 6(a) is a plan view of a separating sheet of the magnetic tape cassette according to the present invention, and FIG. 6(b) is a cross sectional view taken along line A—A of FIG. 6(a).

FIG. 7 shows a magnetic tape cassette of the present invention provided with the above separating sheet.

In this embodiment, the separating sheet 1 is provided not only with a plurality of dome-shaped or truncated cone-shaped protrusions 2 (dimples) projecting toward a magnetic recording tape 3, a window 5, and holes 10 but also with second protrusions 6 (dimples) projecting toward a half casing 4 of the cassette. The dimples 6 provide cushion or buffer effects to the separating sheet. For this purpose, there may be provided at least one dimple in the peripheral portion of the separating sheet. Preferably, at least two dimples are provided at the positions as indicated in FIG. 6(a). The dimples may otherwise be provided at the central portion. Namely, a proper number of dimples 6 may experimentarily be determined taking into accounts the overall effects in combination with the dimples 2, and such determination can readily be done. As shown in FIG. 7, the separating sheet is held at a distance from the half casing 4 by the dimples 6 with the conventional dimples 2 being in contact with the side surface of the wound tape, whereby the cusion or buffer effects are ensured.

By virtue of the present invention, the height of the dimples 2 can be set to be equal to or less than the height of the conventional dimples, and the overall height of the two kinds of the dimples can appropriately be apportioned or shaped by the dimples 2 and the dimples 6.

For instance, the same effect as obtained by the conventional separating sheet may be obtained by setting the height of the dimples 2 to be ½ of the height of the conventional dimples and the height of the dimples 6 to be likewise ½ of the height of the conventional dimples. Because of the quality requirements, the height of the dimples used to be limited within a range of from 0.1 to 0.5 mm. Whereas, according to the present invention, the upper limit for the overall height of the dimples can be set as high as 1.0 mm (i.e. 0.5 mm of the height of the dimples 2 plus 0.5 mm of the height of the dimples 6) i.e. twice the height of the conventional dimples, thus providing substantial merits or freedom for the designing and quality control of the separating sheet.

Having thus described a specific embodiment in which the specific number and locations of the dimples 2 and 6 are illustrated, it should be understood that it is possible to provide the dimples 6 in a greater number than the dimples 2 or the dimples 2 and 6 may take various other forms or configurations.

FIG. 8(a) is a perspective view of a conventional separating sheet provided with fold-ridges, and FIG. 8(b) is a cross sectional view taken along line B—B of FIG. 8(a). The separating sheet 1 is a smooth plastic sheet provided with a pair of holes 11 through which shafts for driving the magnetic recording tape extend and with a see-through window 5 through which the winding of the tape is observable. A plurality of fold-ridges 2' extend radially from each hole 11. The separating sheet is interposed between the tape and the half casing of the cassette with the fold-ridges facing the tape, so that the fold-ridges establish a line contact with the side surface of the wound tape whereby the friction with the wound tape is reduced and the fold-ridges gently press the side surface of the wound tape with a proper cushioning force to permit smooth running of the tape and to regulate the winding of the tape so as to attain uniform winding. However, in order to improve the tape winding, it is necessary to set the height h of the fold-ridges to be sufficiently high, which is practically rather difficult. If the sheet material is drawn so deeply as to form fold-ridges having a sufficient height, it is likely that the sheet material ruptures as a result of the deep-drawing, or the formed ridges tend to be susceptible to deformation as they bear the weight of the wound tape. In a case where the ends 2'a and 2'b of each fold-ridge are open at the edges of the sheet as illustrated, it becomes more difficult to control the height h of the fold-ridge, and the variation in the degree of the deformation of the fold-ridges tends to be greater depending upon the locations of the fold-ridges. If the fold-ridges are flattened by the weight of the wound tape, the friction with the tape increases accordingly, thus leading to deterioration of the running characteristic of the tape and the pressing effect, against the wound tape, of the separating sheet on the opposite side of the tape will be reduced, thus leading to deterioration of the tape winding.

According to another embodiment of the present invention, the separating sheet is provided with a pair of holes for shafts for driving the tape, and at least one rib-shaped first protrusion projecting toward the tape and at least one second protrusion projecting toward the half casing are located around each hole. It is preferred that the rib-shaped first protrusion extends radially from each hole and has a length such that each end thereof does not reach the edge of the separating sheet, whereby the rib-shaped protrusion is hardly susceptible to deformation against the weight of the wound tape. Good cushion or buffer effects are thereby obtainable.

According to this embodiment, the height of the rib-shaped protrusion may be set to be lower than the height of the conventional fold-ridge, whereby it is easy to control the height and there will be no trouble such as rupture of the sheet or a variation in the degree of the deformation. The cushion effects of the hardly deformable rib-shaped protrusions will be adequately supplemented by the second protrusions provided on the other side of the separating sheet, whereby it is possible to secure superior cushion effects and low friction as a whole. Thus, superior running characteristics and tape winding can thereby be obtained.

This embodiment will be described in further detail with reference to the drawings. Referring to FIG. 9(a), the separating sheet 1 of this embodiment is provided with a rib-shaped protrusion 2' projecting toward the tape and extending radially from each hole 11 for a driving or driven shaft. It is further provided on the other side with small circular or oval protrusions 5 (dimples) projecting toward the half casing and located in the vicinity of each rib-shaped protrusion 2'. These rib-shaped protrusions and dimples may have a dome-shaped cross section as shown in FIG. 9(b) or a truncated cone shape. The rib-shaped protrusions 2' may extend from the respective holes to the outer edge of the separating sheet. However, it is preferred that each rib-shaped protrusion 2' has a length slightly longer than the distance between the inner diameter and the outer diameter of the wound-up tape as the tape is fully wound up on a hub. Two or more rib-shaped protrusions may be provided around each hole for the shaft. Even in such a case, it is preferred that one of them is located at the position illustrated in FIG. 9(a) (a more preferable location will be explained hereinafter). The dimples 6 are intended to maintain the separating sheet at a distance from the half casing and thereby to impart cushion or buffer effects thereto. Accordingly, they may be located at any suitable positions other than the illustrated positions. However, they are preferably located at both sides of the rib-shaped protrusion as illustrated. Further, the overall height of these protrusions 4 and 5 may be substantially the same as the height of the conventional fold-ridge type protrusions. Thus, the height of the respective protrusions may be substantially less than the height of the conventional fold-ridge type protrusions, and accordingly when these protrusions are formed on a sheet material, the depth of drawing may be substantially reduced.

More specifically, it has been found that in FIG. 9(a), the ratio of the width t (at the root) to length l (at the root) of the rib-shaped protrusion is preferably within a range of from 1:2 to 1:20, more preferably from 1:4 to 1:10 to obtain superior cushion effects. If the ratio of t:l is less than 1:2, the deflection of the sheet by the weight of the wound tape tends to be too great. On the other hand, if the ratio of t:l is greater than 1:20, the sheet tends to be too stiff to obtain adequate cushion effects, whereby the winding torque will be considerably increased.

With the above construction, the rib-shaped protrusions can be made to have a height substantially less than the height of the conventional fold-ridges, whereby the processing for the formation of the protrusions becomes easy and problems such as rupture of the sheet material or inferior outer appearance are eliminated. Further, the second protrusions on the other side of the separating sheet add to the cushion effects, and accordingly even when the rib-shaped protrusions are hardly deformable, the cushion effects are adequately supplemented by the second protrusions to provide superior cushion effects as a whole. Further, the rib-shaped protrusions are adequately pressed against the side surface of the wound tape, whereby consistent and uniform tape winding is ensured.

As shown in FIG. 11, the rib-shaped protrusion 2' is preferably located, in a slightly curved configuration, along the locus 13 of the feeding or winding point of the tape 3 at the time of feeding or rewinding the tape and at a position slightly forward or rearward of the position of the locus 13, whereby extremely uniform tape winding can be ensured. However, the object of the present invention can be attained when the rib-shaped protrusion is provided within a range of ±60° from line X—X of FIG. 9(a) i.e. the line passing through the centers of the holes 11.

Having thus described specific embodiments of the present invention, it should be understood that various modifications may be made within the scope of the present invention. For instance, the separating sheet may be provided with, in addition to the above mentioned rib-shaped protrusion, a plurality of dome-shaped or truncated cone-shaped protrusions 8 on the same side of the separating sheet.

What is claimed as new and desired to be secured by Letters Patent of the United States is:

1. In a magnetic tape cassette having two half casings enclosing at least one magnetic tape reel upon which a magnetic tape is wound, a separating sheet comprising:
   a flat sheet having a first surface facing one of said half casings and a second surface facing said magnetic tape;
   a plurality of first discrete protrusions in said flat sheet and projecting towards said tape; and
   a plurality of second discrete protrusions in said flat sheet and projecting toward said half casing, each of said first and second protrusions being separated and surrounded by flat portions of said flat sheet, said flat portions being in the plane of said sheet.

2. The magnetic tape cassette according to claim 1 wherein the separating sheet is provided with a pair of holes for shafts for driving the tape, and a plurality of the first protrusions and at least one second protrusion are located around each hole.

3. The magnetic tape cassette according to claim 1 wherein the separating sheet is provided with a pair of holes for shafts for driving the tape, and at least one rib-shaped first protrusion and at least one second protrusion are located around each hole.

4. The magnetic tape cassette according to claim 3 wherein the rib-shaped first protrusion extends radially from each hole and has a length such that each end thereof does not reach the edge of the separating sheet.

5. The magnetic tape cassette according to claim 3 wherein at least one second protrusion is located adjacent to the first rib-shaped first protrusion.

6. The magnetic tape cassette according to claim 3 wherein the rib-shaped first protrusion has a width to length ratio of from 1:2 to 1:20.

* * * * *